Patented Apr. 15, 1952

2,592,628

UNITED STATES PATENT OFFICE 2,592,628

TREATMENT OF NONALPHA TOCOPHEROLS

Leonard Weisler, Rochester, N. Y., assignor, by mesne assignments, to Eastman Kodak Company, Rochester, N. Y., a corporation of New Jersey No Drawing. Application October 27, 1949, Serial No. 123,986

12 Claims. (Cl. 260—333)

This invention relates to vitamin E and is particularly concerned with enhancing the vitamin E activity of tocopherol material and with the intermediate products formed thereby.

The group of related compounds possessing vitamin E biological activity have been named tocopherols. Vitamin E-active tocopherol material occurs in nature, notably in vegetable oils such as wheat germ oil, soybean oil, cottonseed oil, corn oil and the like. The tocopherols are characterized by a chroman-like nucleus having a phenolic hydroxyl group in the 6 position on the nucleus.

Four tocopherols have been found in nature and designated respectively as alpha-, beta-, gamma- and delta-tocopherol. Of these naturally-occurring tocopherols, alpha-tocopherol exhibits the highest degree of vitamin E biological activity, as measured by resorption sterility tests on rats, both as the free tocopherol and in esterified form.

The non-alpha tocopherols possessing relatively lower vitamin E potency than alpha-tocopherol are characterized by having at least one aromatic hydrogen atom on the benzenoid nucleus. Thus, of the naturally-occurring tocopherols which have been found in vegetable oils, gamma-tocopherol has an aromatic hydrogen atom in the 5 position on the nucleus ortho to the phenolic hydroxyl group in the 6 position on the nucleus; beta-tocopherol has an aromatic hydrogen atom in the 7 position on the nucleus and delta-tocopherol has aromatic hydrogen atoms in the 5 and 7 positions on the nucleus. These relatively low potency tocopherols usually occur in the form of the free tocopherol, but like alpha-tocopherol are readily esterified by known methods, as by treatment with an acyl halide, to introduce an ester group such as the acetate or palmitate group in the 6 position on the nucleus. These non-alpha tocopherols constitute a substantial proportion of the available naturally-occurring tocopherol material, such non-alpha tocopherols usually being found in admixture with some alpha-tocopherol. The structural formulas for beta-, gamma- and delta-tocopherol respectively are as follows:

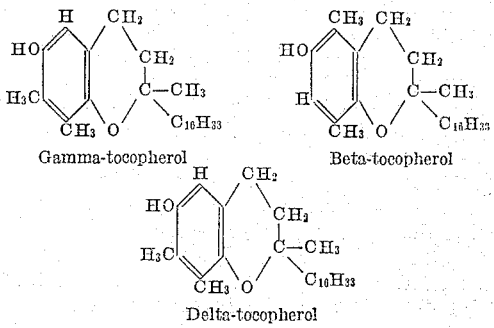

Gamma-tocopherol  Beta-tocopherol

Delta-tocopherol

The wide occurrence of non-alpha tocopherols makes it desirable to provide a method of enhancing the vitamin E biological activity of such tocopherols in order to increase the available supply of highly effective vitamin E.

It is therefore an object of this invention to provide a new and useful method of enhancing the vitamin E activity of tocopherol material normally possessing relatively low vitamin E activity.

It is a further object of the invention to convert tocopherol material characterized by having an aromatic hydrogen atom on the benzenoid nucleus to a more active form.

Another object is to provide an economically feasible method of introducing methyl groups on the nucleus of tocopherol material normally resistant to direct methylation.

Another object is to provide a method of converting non-alpha tocopherols to alpha-tocopherol in good yield.

Another object is to provide biologically active tocopherol derivatives useful as therapeutic agents.

Another object is to provide formylated tocopherol material having biological activity and readily reducible to tocopherol material of enhanced vitamin E biological activity.

Another object is to provide a simple method of enhancing the vitamin E activity of beta-, gamma- and delta-tocopherol.

Another object of the invention is to provide a method of effecting substitution on the nucleus of non-alpha tocopherol material in a position ortho to the phenolic hydroxyl group without objectionable decomposition or polymerization of the tocopherol material being treated.

Other objects will be apparent from the description and claims which follow.

These and other objects of the invention are attained by subjecting tocopherol material characterized by having at least one aromatic hydrogen atom on the nucleus to formylation effective to replace said aromatic hydrogen atom or atoms with formyl groups whereby a biologically active formylated tocopherol derivative is obtained, and reducing the thus formylated tocopherol material whereby the substituent formyl groups are reduced to methyl groups to yield a product having substantially enhanced vitamin E biological activity.

Aromatic compounds which are nuclearly substituted with a phenolic hydroxyl group are normally resistant to methylation on the nucleus, particularly in a position ortho to the hydroxyl group. I have discovered, however, that tocopherol material having an aromatic hydrogen atom on the benzenoid nucleus can be formylated in the position of such aromatic hydrogen atom as set out more fully hereinafter. The resulting formylated tocopherol material possesses biological activity and is useful in the treatment of muscular degenerative diseases, such as muscular dystrophy, which are characterized by excretion in the urine of excessive amounts of creatine and by muscular weakness. The formyl tocopherol derivatives are thus useful as therapeutic agents either as the free formyl tocopherol or as formyl tocopherol esters, tocopherol materials being readily esterified to form any of the acyl esters such as the acetate, palmitate, myristate and the like.

The formyl tocopherol derivatives are particularly useful in accordance with this invention as intermediates in the process of enhancing the vitamin E activity of relatively low potency tocopherols. I have discovered that the non-alpha tocopherols can be formylated and that the resulting substituent formyl groups can be reduced to methyl groups by the process embodying this invention whereby the vitamin E biological activity of the tocopherol material being treated is substantially increased. Reduction is readily effected employing either the free formyl tocopherols or formyl tocopheryl esters.

The invention is applicable for treating those tocopherols characterized by having an aromatic hydrogen atom on the benzenoid nucleus. In the preferred embodiment, the invention is concerned with treating beta-, gamma- and delta-tocopherols which have an aromatic hydrogen atom ortho to the phenolic hydroxyl group. The non-alpha tocopherols can be treated either individually or in admixture with each other and/or alpha-tocopherol. The tocopherol material treated in accordance with this invention is preferably naturally-occurring tocopherol material such as tocopherol concentrates obtained from vegetable oils or the like but the invention is equally applicable to the treatment of synthetically produced tocopherol material such as that obtained by condensation of phytol with a methyl-substituted hydroquinone.

In commercial practice, it is preferable to treat a concentrate of tocopherol material in accordance with this invention. Suitable tocopherol concentrates are prepared from vegetable oils by subjecting the oils to high-vacuum molecular distillation, solvent extraction, selective adsorption, saponification or other concentrating process or a combination of one or more of such processes. In the case of concentrates containing alpha-tocopherol in admixture with the tocopherol material to be treated, the alpha-tocopherol can be separated out before treatment of the desired tocopherol material if desired, but this is not necessary since alpha-tocopherol is unaffected by the processes embodying this invention.

The tocopherol material being treated is first subjected to formylation in accordance with this invention. Formylation can be effected by subjecting a tocopherol material having at least one aromatic hydrogen atom on the benzenoid nucleus to iminoalkylation and hydrolysis whereby the aromatic hydrogen atom is replaced by a formyl group. The formylation of non-alpha tocopherol by iminoalkylation with hydrogen cyanide and a hydrogen halide in the presence of a metal salt and hydrolysis is described in detail and claimed in the copending application of Weisler Serial No. 123,987, filed October 27, 1949.

Alternatively, the formylation of the tocopherol material can be effected by reacting the tocopherol material with a trihalomethane, such as chloroform, and an alkaline material followed by hydrolysis, as described more fully and claimed in the copending application of Weisler Serial No. 123,988 filed October 27, 1949.

Another efficacious method of effecting formylation is the condensation of a non-alpha tocopherol with hexamethylene tetramine followed by hydrolysis of the resulting condensation product as described in detail and claimed in the copending application of Baxter Serial No. 123,989 filed October 27, 1949.

Another method of formylating the low potency tocopherols is to react such tocopherols with formaldehyde and a hydrogen halide to introduce substituent halomethyl groups in the positions normally occupied by aromatic hydrogen atoms and oxidizing the substituent groups to formyl groups. This method is described more fully and claimed in the copending application of Baxter Serial No. 123,990 filed October 27, 1949.

In the treatment of beta-, gamma- and delta-tocopherols either singly or in admixture, formylation is effective to introduce one or more formyl groups as nuclear substituents on the tocopherol nucleus ortho to the phenolic hydroxyl group. Formylation of gamma-tocopherol gives 5-formyl gamma-tocopherol; formylation of beta-tocopherol gives 7-formyl beta-tocopherol, and formylation of delta-tocopherol usually gives a mixture of 5-formyl delta-tocopherol and 5,7-formyl delta-tocopherol. These formylated tocopherols are biologically active therapeutic agents and are especially effective in the form of esters. Any desired acyl ester of the free or formylated tocopherols can be readily prepared by esterification with an acyl halide such as palmityl chloride, benzoyl chloride or the like or with an acid anhydride such as acetic anhydride and the like. In some cases, an organic free acid can be used for esterification although esterification is somewhat less efficacious than with an acid chloride or anhydride. Of the esters, the fatty acid esters and particularly the esters of fatty acids having not more than twenty carbon atoms are preferred.

The formyl tocopherol derivatives embodying this invention are characterized by the following structural formula

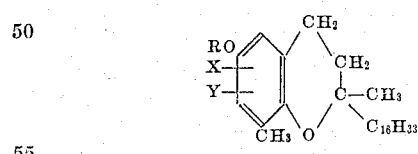

wherein R is either hydrogen or an acyl group, X is a formyl group and Y is either hydrogen, a methyl group or a formyl group.

The substituent formyl groups are readily reduced to methyl groups. Suitable reduction procedures include treatment of the formylated tocopherol material with zinc and mineral acid, reduction according to the Clemmensen procedure, and catalytic hydrogenation at moderate pressures, as for example at 50 pounds pressure, in the presence of a suitable hydrogenation catalyst such as nickel or palladium. The reduction of 5-formyl gamma-tocopherol, 7-formyl beta-tocopherol or 5,7-formyl delta-tocopherol by these or similar reduction processes converts the formyl derivatives to alpha-tocopherol whereby the vitamin E biological activity of the tocopherol material being treated is greatly enhanced.

The invention will be further described with reference to certain preferred embodiments thereof as illustrated by the following examples.

Example 1

A gamma-tocopherol concentrate comprising 80% by weight of gamma-tocopherol was dissolved in dry ether to give a solution of 8.61 parts by weight of the concentrate in 120 volumes of ether. The gamma-tocopherol was then formylated by iminoalkylation and hydrolysis. In effecting the formylation, anhydrous zinc cyanide was added to the ethereal solution in the ratio of 2 moles of zinc cyanide per mole of gamma-tocopherol and dry hydrogen chloride was passed through the solution for 2 hours at room temperature while the solution was being stirred. Thereafter an additional molar equivalent of zinc cyanide was added to the solution and dry hydrogen chloride was passed through the solution for an additional three hours.

The resulting treated tocopherol having a substituent iminomethyl group in the 5 position was allowed to stand overnight without agitation and the mixture was then hydrolyzed by adding thereto 100 volumes of 2.5 N. aqueous sulfuric acid and stirring the mixture for 6 hours. The ether layer was separated from the aqueous layer, washed with water, dried and evaporated. The residue obtained consisted of 9.0 parts by weight of a concentrate of 5-formyl gamma-tocopherol. The conversion of gamma-tocopherol was approximately 75% and the concentrate had $$E_{1\,cm.}^{1\%}(286\ m\mu) = 130$$

The concentrate of 5-formyl gamma-tocopherol was thereafter reduced to alpha-tocopherol by dissolving the concentrate in isopropyl ether and adding to the solution powdered zinc and concentrated hydrochloric acid. The mixture was stirred for 90 minutes at 40° C. and then diluted with about one third its volume of water. The isopropyl ether layer containing alpha-tocopherol produced by reduction of the 5-formyl gamma-tocopherol was separated from the mixture, washed with water, and the solvent removed by evaporation leaving a concentrate of alpha-tocopherol wherein more than 50% of the original gamma-tocopherol had been converted to alpha-tocopherol.

Example 2

A tocopherol concentrate containing 61% total tocopherol in the ratio of about 60 parts of gamma-tocopherol to 30 parts of delta-tocopherol was formylated to give a mixture consisting predominantly of 5-formyl gamma-tocopherol and 5,7-formyl delta-tocopherol. The tocopherol concentrate (23.9 g.) was dissolved in 330 cc. of tetrachloroethane which had been dried over potassium carbonate. Anhydrous zinc cyanide (10.0 g.) was added to the solution and the mixture was cooled to 0° C. Dry hydrogen chloride gas was passed into the mixture for 30 minutes. Finely powdered aluminum chloride (9.2 g.) was slowly added to the mixture and hydrogen chloride gas was passed through the mixture for 90 minutes, during which time the temperature of the mixture was allowed to rise to room temperature. Zinc cyanide (3.0 g.) was added to the mixture and hydrogen chloride gas passed therethrough for 90 minutes at 35-40° C. The mixture was poured into 200 cc. of cold 2.5 N. sulfuric acid and allowed to stand overnight. It was then refluxed and stirred for 15 minutes, cooled, poured into water, and the solvent layer was separated, washed and dried. The solvent was distilled off under reduced pressure leaving a mixed formyl tocopherol concentrate as a red mobile oil which distilled at about 180° C. in a molecular still to give a distillate having $$E_{1\,cm.}^{1\%}(282\ m\mu) = 147$$

and $$E_{1\,cm.}^{1\%}(388\ m\mu) = 43.5$$

A deep red hydrazone was precipitated when a portion of the distillate was added to a 1% solution in ethyl alcohol of 2,4-dinitrophenyl hydrazine. The formyl tocopherol concentrate was reduced by the addition thereto of zinc dust and concentrated hydrochloric acid in an amount equal to the weight of the tocopherol concentrate being reduced, addition being effected slowly over a period of 30 minutes. The mixture was washed with water to remove zinc chloride and acid and filtered through artificial zeolite to remove residual traces of zinc chloride. The solvent was evaporated away leaving a light yellow oil exhibiting an increase in vitamin E potency over the original tocopherol treated of more than 100% by bioassay. The concentrate comprised a mixture of alpha-tocopherol and beta-tocopherol. A repetition of the above process resulted in further enhancement of the vitamin E activity of the concentrate by conversion of beta-tocopherol present in the concentrate to alpha-tocopherol.

Example 3

A tocopherol concentrate containing approximately equal proportions of gamma- and delta-tocopherol was enhanced in vitamin E biological potency by formylation and reduction in accordance with the invention. A solution of 140 g. of concentrate comprising 87.7% total tocopherols dissolved in 1.9 liters of isopropyl ether was mixed with 550 cc. of concentrated hydrochloric acid and 100 cc. of 37% aqueous formaldehyde solution, and the resulting mixture was stirred for 5 hours at 35° C. After being washed with water and dried with anhydrous sodium sulfate, the reaction mixture was subjected to oxidation by the slow addition thereto of 60 g. of p-nitrosodiethyl aniline dissolved in 600 cc. of ethyl alcohol. The mixture was stirred for 15 minutes and allowed to stand overnight to permit settling of solids precipitated during oxidation. The solids were thereafter filtered from the reaction mixture, washed with ether to recover occluded formylated tocopherols and the washings added to the reaction mixture. After being washed successively with sulfuric acid and water, the ether layer was separated and contained a mixture of formyl tocopherol derivatives having $$E_{1\,cm.}^{1\%}(284\ m\mu) = 134$$

and $$E_{1\,cm.}^{1\%}(390\ m\mu) = 60$$

Reduction of the formyl groups was effected by means of zinc-mercury amalgam and concentrated hydrochloric acid in ethanol. The resulting vitamin E concentrate of enhanced potency was recovered by vacuum distillation. Conversion of non-alpha tocopherols to alpha-tocopherol was verified by treatment of the distillate with succinic anhydride and pyridine to give alpha-tocopherol acid succinate which after purification had a melting point of 76-77° C. and $$E_{1\,cm.}^{1\%}(286\ m\mu) = 38$$

Example 4

The conversion of beta-tocopherol to alpha-tocopherol was effected in accordance with this invention by reacting beta-tocopherol with hexamethylene tetramine followed by hydrolysis to give the 7-formyl derivative of beta-tocopherol and reduction of the formyl group to a methyl group. In a typical example, 6 kg. of hexamethylene tetramine and 200 kg. of a tocopherol concentrate were dissolved in 106 gal. of glacial acetic acid. The tocopherol concentrate had an absorption maximum at 292 m$\pi$ and comprised 44% total tocopherols, of which 30% was beta-tocopherol and 70% was alpha-tocopherol. Reaction was effected by heating the solution at 100° C. for 3.5 hours. Hydrolysis was effected by adding to the solution 24 gal. of concentrated hydrochloric acid and heating and stirring the mixture at 40° C. for 90 minutes. A sample of the reaction product had an absorption maximum at 286 m$\pi$ and gave a deep red precipitate with 2,4-dinitrophenyl hydrazine. Reduction of the formylated beta-tocopherol was effected by adding to the reaction mixture 300 gal. of isopropyl ether, 70 kg. of zinc and 24 gal. of concentrated hydrochloric acid. The mixture was stirred for 90 minutes at 40° C. and then diluted with 100 gal. of water. The isopropyl ether layer was separated, washed with water and the ether removed by distillation. Evaluation of the product by the method of Quaife (J. Biol. Chem., 175, 605, 1948) showed no non-alpha tocopherol present indicating substantially complete conversion of the beta-tocopherol to alpha-tocopherol. This was further confirmed by preparation of the crystalline acid succinate melting at 76–77° C.

Example 5

The acetate ester of 5-formyl gamma-tocopherol was prepared as follows. A seven gram portion of 5-formyl gamma-tocopherol was dissolved in a mixture of 12 g. of acetic anhydride and 12 g. of pyridine. The solution was heated on a steam bath for 45 minutes, 20 cc. of water was added and the mixture heated for an additional two minutes. The mixture was then cooled, poured into dilute hydrochloric acid, extracted with ether and the extract subsequently washed successively with dilute hydrochloric acid, dilute sodium carbonate solution and water. The washed extract was thereafter dried and the ether removed by evaporation. The resulting 5-formyl gamma-tocopheryl acetate concentrate was a light yellow oil having $$E^{1\%}_{1cm.}(272\ m\mu) = 113$$

and $$E^{1\%}_{1cm.}(332\ m\mu) = 32$$

A mixture of the concentrate with 2,4-dinitrophenyl hydrazine gave a light yellow precipitate. The acetate ester is biologically active and readily reducible to alpha-tocopheryl acetate by catalytic hydrogenation at 50 pounds pressure using a nickel hydrogenation catalyst.

Example 6

The use of acyl halides furnishes an excellent method of esterification of the formyl tocopherols. For example, a 5.0 g. portion of 5-formyl gamma-tocopherol was dissolved in 15 cc. of ethylene chloride and 4 cc. of pyridine. One molar equivalent of benzoyl chloride dissolved in 15 cc. of ethylene chloride was added to the solution of concentrate. After standing at room temperature for 20 hours, the solution was heated on a steam bath for one hour after which time 30 cc. of water was added and the solution was heated for an additional two minutes. The solution was thereafter cooled, poured into dilute aqueous sulfuric acid and extracted with ether. The ether extract was washed and dried and the ether removed by evaporation leaving a residual oil of 5-formyl gamma-tocopheryl benzoate.

Example 7

Preparation of a fatty acid ester is typified by the following example wherein a solution of 25.6 g. of 7-formyl beta-tocopherol dissolved in 75 cc. of ethylene chloride and 20 cc. of pyridine was esterified with palmitoyl chloride. Esterification was effected by adding 10.9 g. of palmitoyl chloride dissolved in 75 cc. of ethylene chloride to the formyl tocopherol solution, allowing the resulting mixture to stand for 20 hours at room temperature, thereafter heating it for one hour on a steam bath, adding 30 cc. of water and heating the mixture for an additional two minutes. The resulting 7-formyl beta-tocopheryl palmitate was extracted from the reaction mixture with ether and obtained as a residue by evaporation of the ether. Other fatty acid esters, such as the stearate, oleate and myristate, of this and other formyl tocopherols are readily prepared in similar manner. The formyl tocopheryl esters are readily reduced to alpha-tocopherol esters by known reduction processes as described hereinabove.

Example 8

Two grams of a gamma-tocopherol concentrate comprising 72.5% total tocopherols by Emmerie-Engel assay, of which tocopherol 92.5% was non-alpha tocopherol, was dissolved in 20 ml. of peroxide-free dioxane containing 0.66 g. of potassium hydroxide. A trace of water was added to the dioxane to completely dissolve the potassium hydroxide. The solution was refluxed and nitrogen was bubbled through it for 10 minutes during which time 4.3 g. of chloroform was added dropwise to the reaction mixture. The solution then refluxed for 75 minutes, cooled, and acidified with 5% sulfuric acid. After heating the acidified solution for 45 minutes at 60° C., the solution was extracted with ether, the ether extract washed to neutrality and dried over sodium sulfate, and the ether removed by evaporation. The resulting residual oil weighed 2.05 g. and showed 43.2% tocopherol by Emmerie-Engel assay. Formation of the 5-formyl gamma-tocopherol was shown by the reaction with dinitrophenyl hydrazine and by the shift in absorption maximum from 297 m$\mu$ for the original concentrate to 290 m$\mu$ for the product oil. The formyl groups were then reduced to methyl groups by treating a solution of the product in isopropyl ether with zinc dust and hydrochloric acid for two hours at 45° C. An alpha-tocopherol concentrate having $$E^{1\%}_{1cm.}(294\ m\mu) = 59.2$$

was obtained by extracting with ether, washing the ether extract to neutrality and removing the ether by evaporation.

This invention thus provides a simple and economically feasible method for enhancing the vitamin E biological activity of tocopherols normally possessing relatively lower potency than alpha-tocopherol by subjecting such non-alpha tocopherols to formylation and reduction. The method is of particular importance in converting the naturally-occurring beta-, gamma- and delta-tocopherols to alpha-tocopherol.

While the invention has been described in considerable detail with reference to certain preferred embodiments thereof, it will be understood that variations and modifications can be effected within the spirit and scope of the invention as described hereinabove and as defined in the appended claims.

What I claim is:

1. The method of enhancing the vitamin E biological activity of a tocopherol compound normally possessing relatively low vitamin E biological activity which comprises in combination formylating a tocopherol compound characterized by having at least one aromatic hydrogen atom on the benzenoid nucleus and thereby replacing said aromatic hydrogen atom with a formyl group, and reducing the resulting substituent formyl group to a methyl group.

2. The method of enhancing the vitamin E biological activity of a tocopherol compound having at least one aromatic hydrogen atom on the nucleus and being selected from the class consisting of beta-tocopherol, gamma-tocopherol and delta-tocopherol which comprises replacing said aromatic hydrogen atom on the nucleus of said tocopherol compound with a formyl group and reducing said formyl group to a methyl group.

3. The method of enhancing the vitamin E biological activity of a tocopherol compound normally possessing relatively low vitamin E activity which comprises formylating and reducing a tocopherol characterized by having at least one aromatic hydrogen atom on the benzenoid nucleus ortho to a phenolic hydroxyl group.

4. The method of treating delta-tocopherol characterized by having an aromatic hydrogen atom in each of the 5 and 7 positions on the nucleus which comprises replacing at least one of said aromatic hydrogen atoms with a methyl group by subjecting said delta-tocopherol to formylation and reduction.

5. The method of treating gamma-tocopherol having an aromatic hydrogen atom in the 5 position on the nucleus to enhance the vitamin E biological activity of said gamma-tocopherol which comprises replacing said aromatic hydrogen atom with a methyl group by subjecting said gamma-tocopherol to formylation and reduction.

6. The method of treating beta-tocopherol having an aromatic hydrogen atom in the 7 position on the nucleus to enhance the vitamin E biological activity of said beta-tocopherol which comprises replacing said aromatic hydrogen atom with a methyl group by subjecting said beta-tocopherol to formylation and reduction.

7. The method of treating delta-tocopherol having aromatic hydrogen atoms in the 5 and 7 positions on the nucleus to enhance the vitamin E biological activity of said delta-tocopherol which comprises replacing each said aromatic hydrogen atom with a methyl group by subjecting delta-tocopherol to formylation and reduction.

8. As a new chemical compound, a formylated tocopherol having the formula

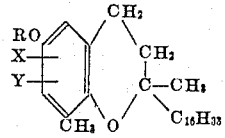

wherein R is a member selected from the class consisting of hydrogen and acyl groups, X is a formyl group and Y is a member selected from the class consisting of hydrogen, methyl groups and formyl groups.

9. 5-formyl gamma-tocopherol of the structure

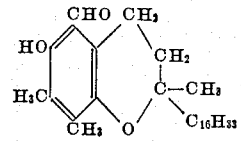

10. 5-formyl delta-tocopherol of the structure

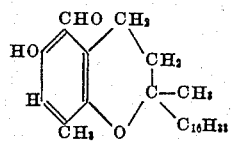

11. 5,7-diformyl delta-tocopherol of the structure

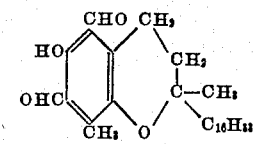

12. 7-formyl beta-tocopherol of the structure

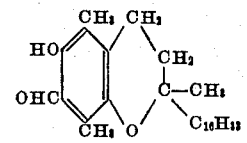

LEONARD WEISLER.

REFERENCES CITED

The following references are of record in the file of this patent:

UNITED STATES PATENTS

| Number | Name | Date |
|---|---|---|
| 2,486,542 | Weisler et al. | Nov. 1, 1949 |

OTHER REFERENCES

Smith: J. Am. Chem. Soc. 56, 474 (1934).
Chemical Abstracts 40, 6445, (1946).